US009886524B1

(12) United States Patent
Richardson et al.

(10) Patent No.: US 9,886,524 B1
(45) Date of Patent: Feb. 6, 2018

(54) SYSTEM AND METHOD FOR PROVIDING A REPORT OF GENERALLY AVAILABLE INFORMATION

(71) Applicant: Sterling Infosystems, Inc., New York, NY (US)

(72) Inventors: Michael M. Richardson, New York, NY (US); David S. De Angelo, New York, NY (US); Frank A. Materia, Farmingdale, NY (US); Eduard Spivak, Fair Lawn, NJ (US)

(73) Assignee: STERLING INFOSYSTEMS, INC., New York, NY (US)

( * ) Notice: Subject to any disclaimer, the term of this patent is extended or adjusted under 35 U.S.C. 154(b) by 715 days.

(21) Appl. No.: 14/073,486

(22) Filed: Nov. 6, 2013

Related U.S. Application Data

(63) Continuation of application No. 12/315,081, filed on Nov. 26, 2008, now abandoned.

(60) Provisional application No. 61/004,590, filed on Nov. 28, 2007.

(51) Int. Cl.
*G06F 17/30* (2006.01)
(52) U.S. Cl.
CPC .............................. *G06F 17/30979* (2013.01)
(58) Field of Classification Search
None
See application file for complete search history.

(56) References Cited

U.S. PATENT DOCUMENTS

| 2005/0091674 | A1* | 4/2005 | Knight | G06F 9/4428 |
| | | | | 719/332 |
| 2005/0131970 | A1* | 6/2005 | Salazar | G06F 17/30569 |
| 2006/0190265 | A1* | 8/2006 | Kurganov | H04M 3/4938 |
| | | | | 704/270.1 |
| 2006/0206584 | A1* | 9/2006 | Hyder | G06F 17/30864 |
| | | | | 709/218 |

\* cited by examiner

*Primary Examiner* — Jau-Shya Meng
(74) *Attorney, Agent, or Firm* — Michael G. Monyok

(57) ABSTRACT

Systems and methods are provided that produce a report of generally available information, including over networks and particularly the Internet.

9 Claims, 12 Drawing Sheets

Sterling MIP Module Block Diagram:

Fig. 11

| Initial Municipality (SAP) Questionnaire |||
|---|---|---|
| General Section | Questions | Answers/Comments |
| | Does the SAP provide Traffic Criminal data example: DWI | |
| | Does the SAP provide all the mandatory fields and search criteria? | If the minimum criteria are not me, this is not a good candidate for MIP |
| | How is the change management process handled by the SAP? How will a change to the data or format be communicated to us? | |
| | How is the alias data identified? | |
| | What type of court jurisdiction data does the SAP provide? | |
| | Do they have a defined list for disposition example: acquitted, convicted , guilty etc. | |
| | Do they have a defined list for disposition example: federal, regional etc | |
| | In case of data dumps or FTP, do they provide data for expunged records? | |
| | Number of searches per month. | |
| SAP Specific Section | Questions | Comments |
| Online Search (Web Service, XML Gateway, HTTP Server) | Provide the list of error codes and descriptions that the service will return. | |
| | Provide the URL and access mechanisms | |
| | Is there a system downtime or maintenance schedule? | |
| Web Site | Is there a support email id | |
| | Is there a system downtime or maintenance schedule? | |
| FTP, Data Dumps, HTTP Server | Describe the file naming conventions of the extract. | |
| | What is the frequency and time when we will receive the data extract (e.g. Daily 8am, weekly Sundays 11am?) | |
| | Do we have a list of holidays when the extract will not be generated? | Suppose the vendor provides a daily file update, and if there is a holiday, the extract is not generated that day.....we would like to know if there are some known days when they will not provide the scheduled extract |
| | If it's a periodic update and not a complete overwrite of data, how do we identify inserts, updates and deletes? | |

Fig. 12

| Vendor Field Name | Sterling Standard Field Name | Sample 1 | Sample 2 |
|---|---|---|---|
| Search Results | | | |
| Last Name | Defendant Last Name | SMITH | SMITH |
| First Name | Defendant First Name | JOHN | DANARD |
| Middle Name | Defendant Middle Name | DAVIS | |
| Race | Race Code | B | B |
| Sex | Sex Code | M | M |
| DOB | Defendant Date of Birth | 3/3/44 | 10/12/1970 |
| | | | |
| Cases | | | |
| Case | Case Number | F9103402 | M92075585 |
| Filed date | Case Filed Date | 08/25/1991 | 06/15/1992 |
| Closed Date | Case Status | 09/25/1991 | 07/07/1992 |
| Closed Date | Disposition Date | 09/25/1992 | 07/07/1993 |
| First Charge | | BURGLARY/UNOCC DWELL | BURGLARY/UNOCC DWELL |
| | | | |
| Case Details | | | |
| COURT CASE | | F9103402 | M92075585 |
| State Case# | Docket | 131991CF0304020001XX | 131992MM0755850001XX |
| Name | | SMITH, JOHN | SMITH, DANARD |
| DOB | | 08/14/1948 | 10/12/1970 |
| Date Filed | | 08/25/1991 | 9/29/1992 |
| Date Closed | | 09/25/1991 | 3/10/1993 |
| Warrant Type | | | |
| Hearing Date: | | | |
| Hearing Time | | | |
| Hearing Type | | | |
| Courtroom | | REGJB-JUSTICE BUILDING,ROOM=;2-2 | REGJB - JUSTICE BUILDING, ROOM #: 2-11 |
| Address: | Defendant Address Line #1 | 1351 N.W. 12 ST | 1351 N.W. 12 ST |
| Next Case | | | |
| Previous Case | | | F92030979 |
| Judge | | MURPHY, DENNIS J | MILLS-FRANCIS, KAREN |
| Defense Attorney | | PUBLIC DEFENDER APPOINTMENT, ASSIGN | |
| Bfile Section | | F017 | M006 |
| File Location | | DESTROYED | DESTROYED |
| Box Number | | | 87-0326 |
| ALT Section | | | M006 |
| ALT/Backup Judge | | | MILLS-FRANCIS, KAREN |
| | | | |
| Seq# | Charge Count | 1 | 1 |
| Charge | Charged Offense Description | BURGLARY/UNOCC DWELL | CANNABIS/POSN/0-20 |
| Charge Type | Charged Offense Type | FELONY | MISDEMEANOR |
| Disposition | Disposition | NO ACTION | CONV-PROB SPEC COND |
| | | | |
| Docket | | | |
| COURT CASE | | F9103402 | M92075585 |
| Seq# | | 00005 | 00028 |
| Date | | 09/13/1991 | 03/29/1993 |
| Docket | | NOTICE OF DEFENDANT'S RIGHT TO COUNSEL | STAY GRANTED-DUE 09/10/1993 |
| | | | |
| Additional Info | | | |
| Case Number | | F9103402 | M92075585 |
| Probation Start Date | Sentence Type | 00/00/0000 | 03/10/1993 |
| Probation End Date | Sentence Type | 00/00/0000 | 09/09/1993 |
| Probation Length | Probation Length | | 006 MONTHS |
| Probation Type | Sentence Type | | PROBATION |
| Defendant in Jail | Sentence Type | | N |
| Defendant Released to | | | |
| Bond Amount | | | 0 |
| Bond Status | | | |
| Bond Type | | | |
| Bond Issue Date | | | |
| | | | |
| AKA Names List | | | |
| Last Name | Alias Last Name | MURRY | FLONURY |
| First Name | Alias First Name | LIONEL | RODNEY |
| M | Alias Middle Name | | |
| Race | | BLACK OR AFRICAN AMERICAN | BLACK OR AFRICAN AMERICAN |
| Sex | | MALE | MALE |
| DOB | | 07/14/1947 | 10/12/1970 |

SYSTEM AND METHOD FOR PROVIDING A REPORT OF GENERALLY AVAILABLE INFORMATION

CROSS REFERENCE TO RELATED APPLICATIONS

This application is a continuation of application Ser. No. 12/315,081, filed Nov. 26, 2008, now pending, which claims priority to U.S. Provisional Application Ser. No. 61/004,590, filed Nov. 28, 2007. The foregoing patent applications are hereby incorporated by reference in their entirety to provide continuity of disclosure.

TECHNICAL FIELD

The present invention relates to systems and methods for providing a report of generally available information, including over networks and particularly the Internet.

BACKGROUND

Reports of generally available information, including criminal, financial, educational, professional, and employment related background checks, are a staple tool used by prospective employers, private and public investigators and detective organizations, prospective spouses, and prospective creditors. Many services are currently known and available to generate reports of such information, and the need for additional types of screening information has been increasing over time, due at least in part to the explosive growth of negligent hiring and retention claims against companies which expose companies to large damage awards if they are found liable for breaching its duty of care in selecting and retaining only competent and safe employees. The threat of terrorism has also increased the need to obtain reports of information about particular people, places, and things in a timely manner. For all these reasons, people and organizations have an increasingly powerful incentive to learn and gather as much information as possible about the character, reputation, and characteristics of the people, places, and things they are going to associate with.

The Internet and World Wide Web have spawned a variety of services allowing individuals and organizations to search for specific information about other parties, for example a family could perform a criminal background check on a prospective nanny, find out the owner of vehicle based on the license plate or vehicle identification number, or screen prospective business partners, political leaders, and teachers. Today, human resource managers are often overwhelmed with an abundance of critical applicant data on prospective employees. In fact, many employers complain that ordering and tracking such information, such as criminal background checks, employment and education verification, and drug screening are among the biggest hurdles to expediting the hiring process. To address this need, there have arisen over time a variety of systems and services designed to provide reports of background screening information. While such prior art systems and services may provide useful results, there remains a strong need for even faster, broader, more accurate, and more cost-effective searching and reporting of generally available information, with less effort and time.

SUMMARY OF THE INVENTION

In one embodiment, the present invention provides a computer-implemented method that automates the process of procuring data from generally available data sources for purposes of aggregating and generating reports of such data in a format for presentation to a user. In one aspect, the present invention provides a computer-implemented method of providing a report of generally available information by establishing a computer network in communication with a plurality of external data sources. A computer program running on the computer network is programmed to identify attributes associated with the data sources, and stores the attributes in a digital register of the computer network. Once the attributes are identified, the data sources are prioritized into a ranked order to initiate a search.

a. To initiate a search, a user generates a search request comprising search criteria that substantially uniquely identifies a person, place, or thing to be searched (e.g. name, address, date of birth, social security number, etc). The program then points the search request to one or more data sources from which to initiate the search, based on a recommended search path based on the rankings of the data sources, the content of search criteria, and other user defined goals or parameters of the search, such as to achieve maximum speed or minimum cost. Once the search request is sent to a selected data source, the program determines whether or not the selected data source is capable of communicating with the computer network, and if so, whether or not the selected data source contains any data that matches the criteria of the search request.

If the program determines that the data source is presently capable of communicating with the computer network, and if the data source contains matching data, the data is transmitted through the computer network in HR-XML format for storage in a network database repository. The data is then aggregated and formatted in a report for presentation to the user or requestor. In one embodiment, if the data source does not contain matching data, the program will return a value indicating that no matching data was found. In such case, the program may optionally point the search request to an alternative data source, or the program may optionally send a work request to a human researcher, directing the researcher to undertake a manual search of such data sources, and manually input matching data into the database for further processing.

BRIEF DESCRIPTION OF THE DRAWINGS

The foregoing features of the invention will be more readily understood by reference to the following detailed description, taken with reference to the accompanying drawings, in which:

FIG. 11 is a table illustrating a questionnaire to identify attributes associated with a data source for carrying out processes in accordance with an exemplary embodiment of the present invention; and FIG. 12 is a table illustrating results obtained from search requests in accordance with an exemplary embodiment of the present invention.

DETAILED DESCRIPTION

Definitions of Abbreviations

Figure 1:
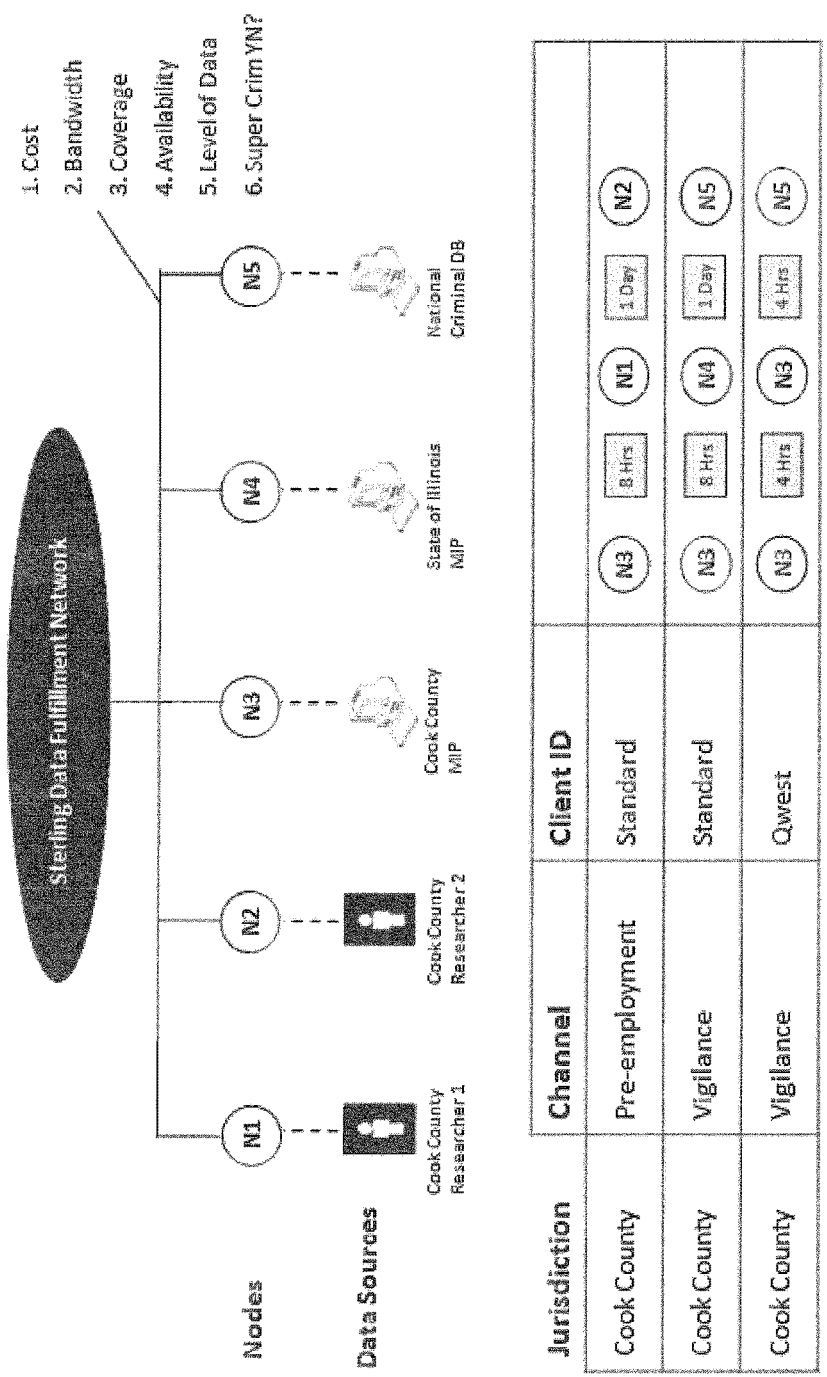
FIG. 1 is a diagram illustrating a data fulfillment network in accordance with an exemplary embodiment of the present invention for carrying out processes accordingly.

MIP: Municipal Integration Project
SAP: Single Agency Project
XML: Extensible Mark Up Language
DB: Database
SOW: Statement Of Work
SRS: System Requirements Specifications
MIP-HD: MIP Help Desk
DSA: Sterling's Designated System Administrator
QC: Quick Clear
SO: Sexual Offender
CWI: Complete Website Integration FIG. 1 is a diagram illustrating a data fulfillment network in accordance with an exemplary embodiment of the present invention. The data fulfillment network is a web-based, order entry, tracking and reporting system which electronically accesses information from generally available data sources on the Internet, for example federal, state, and local databases of personalized information to conduct background screening or other reporting services for individuals or organizations worldwide. In accordance with the systems and methods described herein, the present invention is able to provide fast turnaround times and cost-effective searches by integrating all levels of data sources, allowing the network to search more databases accurately with less time and effort.

As shown in FIG. 1, each node in the network is a virtual representation of an external data source controlled by an outside vendor. Attributes associated with the data sources, such as (1) the type of data provided by the data source; (2) the location of the data source; (3) the data transfer rate of the data source (i.e. bandwidth); (4) the coverage of the data; (5) the availability of the data source (i.e. how often can it be accessed); (6) the cost of the data; and (7) the level of integration of the data are identified and programmed into the network. With reference to FIG. 1, and throughout the present disclosure, the data fulfillment network may be referred to as a smart network. By smart network, it is meant that the network knows information (i.e. attributes) about each of the different data sources required to integrate, link, or plug the data sources into the smart network, thus enabling the network to intelligently prioritize the data sources based on such attributes in order to tailor or optimize a search path based on user defined objectives of the search request.

To initiate a search, a user generates a search request comprising search criteria that substantially uniquely identifies a person, place, or thing to be searched (e.g. name, address, date of birth, social security number, etc). The program then points the search request to one or more data sources from which to initiate the search, based on a recommended search path generated by the program taking into consideration the respective rankings of the data sources, the content of the search criteria, and other user defined goals of the search, such as maximum speed or minimum cost. As discussed in more detail below, once the search request is sent to a selected data source, the program determines whether or not the selected data source is capable of communicating with the computer network, and if so, whether or not the selected data source contains any data that matches the criteria of the search request.

In this embodiment, the smart network does not control the data sources, but rather derives the attributes of the data sources required to integrate the data sources so that the network is able to detect, for example, when the systems have exceeded the capacity of one of the data sources. In such case, the network is adapted to optionally direct the search request to alternative nodes or data sources to obtain the same or similar results, or to direct a human researcher to undertake a manual search of such data sources, and manually input matching data into the database for further processing. By matching data, it is meant data located in the data source which is deemed relevant to the given search criteria.

As shown in FIG. 1, for example, it is possible that criminal data about an individual may be contained in both local (i.e., city, county) and statewide databases, either of which may be alternatively accessed to obtain the desired criminal background data. By knowing the attributes of each data source, the smart network is configured to prioritize the data sources into a logical ranked order based on the relative cost of data, speed of data, content of data, and availability of the data source. In this way, the network provides a preferred search path directing the network to search a particular data store first, and then provide a failover switch to an alternative data source if the first data source is down, oversubscribed, or otherwise unavailable for technical reasons such as bandwidth restrictions. Optionally, the network is configured to send a work request to a work list, directing a human researcher to manually search the data source and input relevant or matching data into the database repository of the network.

By introducing attributes of the data sources into a register, the smart network is very client-specific; that is, if the user wants the fastest turn-around time, the system is programmed to provide a recommended path of data sources to be followed. Similarly, if the user wants the least expensive search, the system knows to provide an alternative search path based on minimizing cost. In this way, the system can be configured to follow a predetermined search path depending on user defined parameters for the search, such as to achieve maximum speed, minimal cost, or broadest data coverage. The invention thus provides a configurable smart network which knows all the relevant information (i.e. attributes) associated with the integrated data sources. In order to fulfill a particular request, a variety of different search paths may be taken to achieve the desired results based on a user's preference, or even allowing the user to select a particular human researcher to conduct the search.

As mentioned above, the present invention provides the option of directing human researchers to physically search data source records. This includes the option of directing the human researcher to make calls to verify personal references, or to conduct a manual search of other data sources which may be intermittently or temporarily unavailable. Furthermore, the network is configured to distribute such personal requests to one or more human researchers based on the availability of that person. In other words, the system may be configured to limit or restrict calls to a particular human researcher based on the work load limitations or capabilities of the actual person.

The present invention thus contemplates application in many other contexts whereby it is necessary to enlist people, in an efficient manner, to undertake manual research of data sources which are intermittently or temporarily unavailable electronically, for example in environmental monitoring applications where data sources maybe changing state continuously, wherein availability of the data source to provide data may be dependent on any number of factors.

The ability of the smart network to provide failover send requests is based on the network's ability to monitor the availability of particular data sources. For example, if the request queue of a particular data source is backed-up and a search request is not fulfilled within a certain amount of time, the system is capable of canceling the search request, and sending the failover search request to the next data source in the preferred search path. The system is therefore smart enough to automatically seek-out and search alternative data sources under controlled conditions as defined by the attributes of each data source.

As mentioned above, the present invention also implements the concept of work-lists, whereby a human researcher is able to log into the network to gain access to search requests directed to that person, wherein the network is configured to limit the number of search requests directed to such person based on the work-load limitations of that person, i.e. the availability of a person to handle a number of search requests in a given timeframe. In this way, not only can the network have one data source that points to an actual person that runs out to the physical location of the data source to get the information, the system may also point to a direct electronic integration with an online website associated with the data source.

The present invention thus provides a software program, or "web robot", that is configured to automatically query online sources of information, and perform a "screen scrape" to retrieve the data as if they were databases, and then send the data back to the network database for aggregation, formatting, and reporting for presentation to a user.

In other embodiments, the present invention allows data sources to automatically plug into the network, thereby deriving the knowledge required to link the data source automatically, thus reducing manual programming requirements and increasing accuracy. Since external data sources often charge fees to access their data, the data sources have an incentive to plug into the smart network for data exchange, thus making their data more accessible by clients, and allowing the network to function as a reseller of other people's data sources.

Unlike prior art methods which provide rigid connections to individual data sources, the systems and methods of the present invention provide a flexible approach which is capable of introspecting individual data sources in whatever highest level they are available. The network is then able to determine a preferred search path based on user defined goals and preferences and data source availability, and then either dispatch a "bot" (i.e. web robot screen scrape) to collect data from the data source, or direct a human researcher to go out to the data source and manually create data from written documents if necessary, and/or combinations of both these levels of integration.

Figure 2:
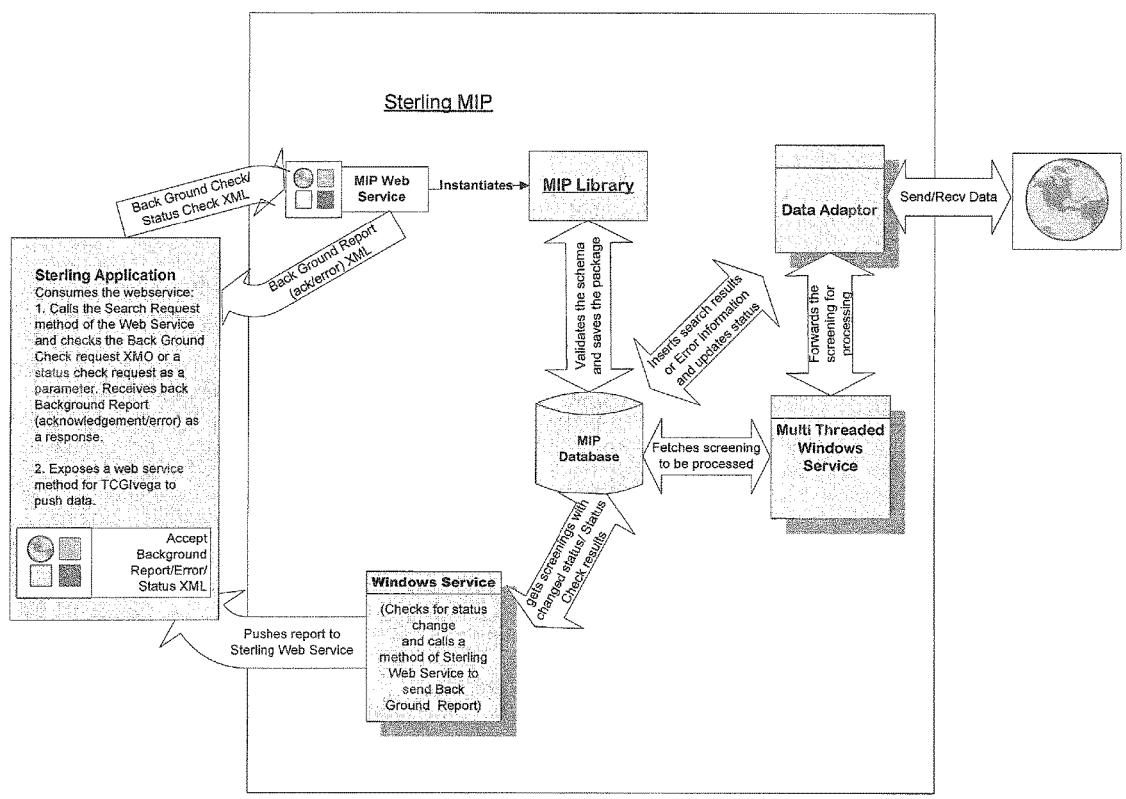
FIG. 2 is a block diagram illustrating generally a process flow associated with an exemplary embodiment in accordance with the present invention.

FIG. 2 is a block diagram illustrating generally a process flow associated with an exemplary embodiment in accordance with the present invention. As shown, the exemplary MIP (municipality integration program) module utilizes industry standard HR-XML schema definitions for sending and receiving data through the network. The Sterling Application calls a SearchRequest method of the MIP Web Service and sends the Back Ground Check request XML or a status check as a parameter. The Sterling Application then receives back Background Report (acknowledgement/error XML document/String of data sent) as a response. It also exposes a web service to be consumed by the MIP application to push in search results.

In the present exemplary embodiment, the application is built on the .Net Framework and SQL Server 2000 as the data store, and parses the HTML elements to get results.

Continuing as in FIG. 2, the application comprises a Web Service Module, Windows Service, Data Adaptor for Data Source, and Reporting Windows Service, each discussed in turn below.

The Web Service Module provides methods SearchRequest and SearchRequestUpdate to the Sterling Application. The web service gets the search request from Sterling and validates it using the validation component for configurable rules like XML Schema Definition, mandatory fields Field length, field value etc. and stores it in the MIP DB though the MIP library.

The Windows Service is a multithreaded application built on the .Net Framework to process Criminal, License, Education, Employment and other types of screenings. It fetches the screening to be processed from the MIP DB and allocates it to the respective Data Adaptor.

The Data Adaptor For Data Source is built on a per integration basis for each data source, and communicates with the respective data sources.

The Reporting Windows Service gets the screenings whose status has changed and posts the results/error/status to the Sterling Web Service.

The results of the search process are then pushed to the Sterling Application through a call to web service. The communication process is asynchronous.

It should be noted that the MIP FTP Windows service is used to maintain the local vendor databases (i.e. data sources) of the vendors who provide their data online (ftp or http), or in CDs or other digital media. Each vendor provides and controls the data, either the update to the existing data or the complete overwrite of the existing data. FTP Window service works as a scheduler which picks up the files from vendor's location via ftp or http protocols, or through data dump from CD or other digital media on the local hard drive of the network, and periodically maintains the databases to be used by MIP System to perform the searches for those integrations.

Figure 3:
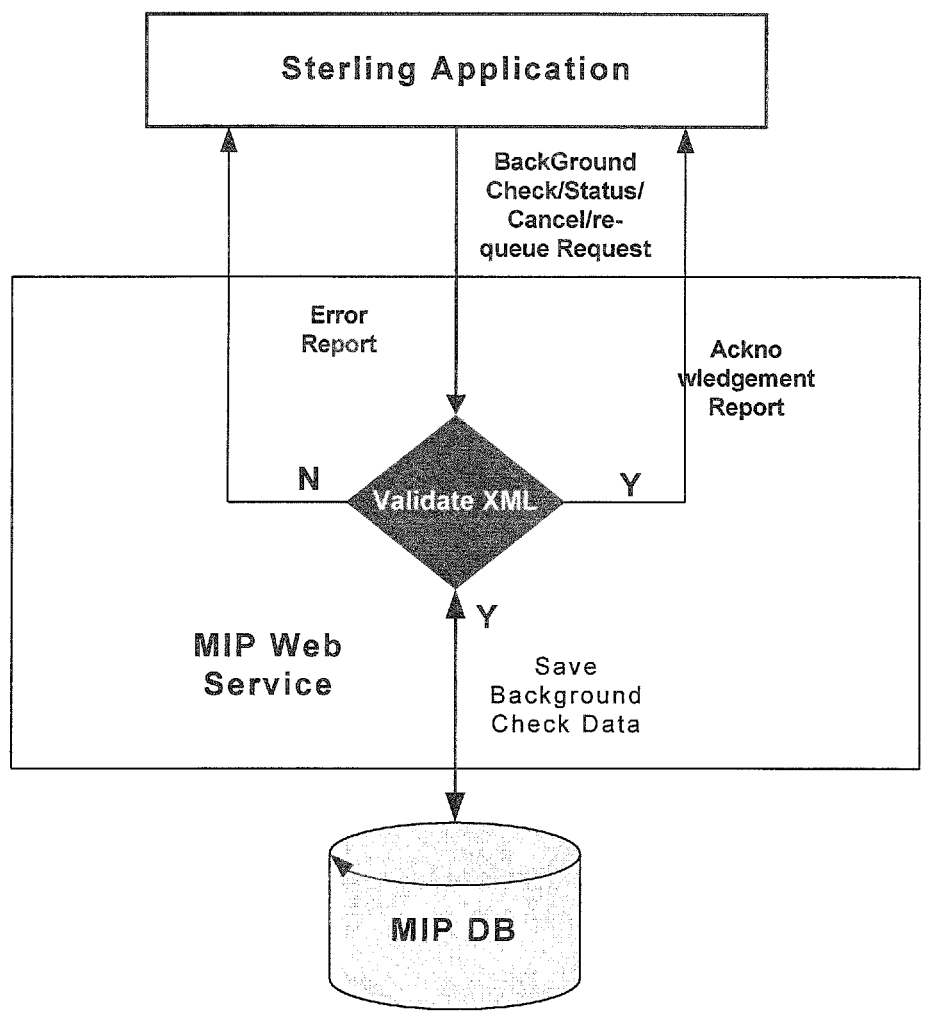
FIG. 3 is a flow diagram illustrating a validation process flow in accordance with an exemplary embodiment of the present invention.

FIG. 3 is a flow diagram illustrating a validation process flow in accordance with an exemplary embodiment of the present invention. With reference to FIGS. 2 and 3, the Sterling Application calls the SearchRequest or SearchStringRequest method of the web service and passes the Background Check Request in HR-XML format. The Web Service method validates the XML based on schema and pre-defined validation rules i.e. the Schema validation and mandatory Ids validation. Integration level will be picked up from the integration's validation File. Following are a few exemplary validation fields which are typically placed: First Name, Last Name, Date of Birth, License Number, Social Security Number, and School ID.

If the validation succeeds, the data is entered in the MIP Database with a status flag describing the request as NEW (yet to be served) and returns an acknowledgment report XML. If the validation fails, web service returns an error report XML.

In case Sterling needs a status Update the SearchRequestUpdate method of the Web Service will be called by sterling and the attribute type in the BackgroundSearchPackage element would be "requestupdate". The Status response for this is posted to the Sterling web service as the background Report (Error/Status/Data).

The Web Service reads all the configurable parameters including DB connection strings from the application configuration file.

Continuing as in FIG. 3, the Validation Component is called by MIP Library to validate the Request received from Sterling. Validation first accomplishes the pre defined validations i.e. Schema validation & Ids validation (whether all the required Ids are present or not and it also checks whether the Ids are unique for the database or not). Then the validation component picks up the validation file of the integration from the ValidationFiles folder of the web service and validates the request against those validations. Validation file contains validations such as Mandatory Field, Max number of characters allowed by the integration, Min number of characters required by the integration, and Fixed value expected in any particular element or attribute.

Figure 4:
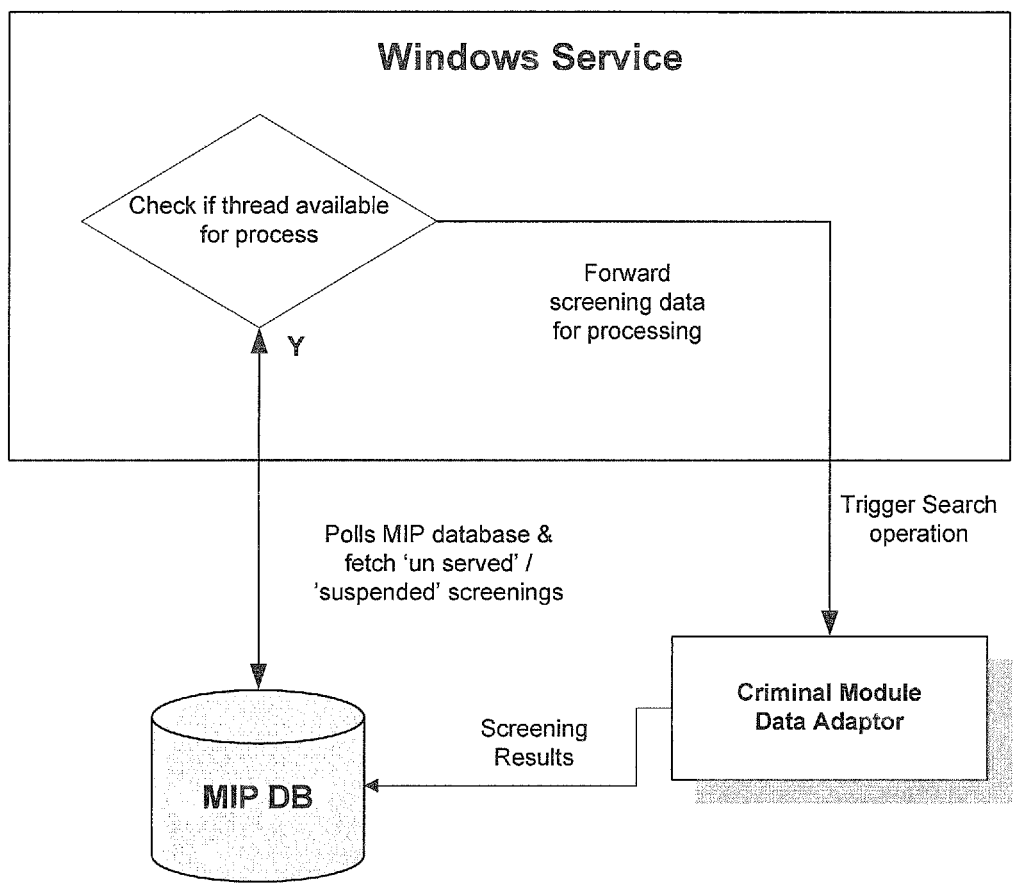
FIG. 4 is a flow diagram illustrating in further detail process flow associated with an exemplary embodiment similar to that of FIG. 2.

FIG. 4 is a flow diagram illustrating in further detail a process flow associated with an exemplary embodiment similar to that of FIG. 2. When a search request reaches the system, certain variables control what type of integration we would have. One type of data source integration is referred to as Quick Clear (QC) integration. The QC framework was developed to make the process systematic and to make the development process easier. QC, which may be referred to as a low level of integration, was developed for integrations where the volume is high and the information provided by the vendor on the website is not sufficient or in some cases where the number of Review orders are less as per the orders history, and also to do the process quickly. Quick Clear modules just return Review or Clear. If there is matching data found for the given search criteria, the system simply returns Review. In such case, a human researcher will be directed to manually search and input the data associated with the search request. On the other hand, the integration's data adaptor returns "Clear" if there is no matching data found for the search criteria specified.

In operation, the QC integration's data adaptor changes the order's status to in process, and checks the input parameters passed to the method and initiates the name search. The Data Adaptor performs the name search (as per the search criteria) on the website by generating the post string of the search parameters and posting the same to the search URL of the integration to get the search result. The Data Adaptor does the string match on the result page to check whether the matching data is found or not. If matching data is found then it saves the result status of the order as "Review". If matching data is not found or if the result page returns the No match string, then it saves the result status as "Clear". Data adaptor also saves the data in relevant tables of MIP Db to generate the result and also updates the order status to "Y" and updates the last_updated_on time to the current time. If the Data Adaptor encounters any error while doing the QC process, it changes the status of the order as per the error type, and will also change the last updated_on time to the current time so that the error report can be generated and sent to the relevant web service to give the intimation of the error occurred.

Another type of data source integration is referred to as Complete Website Integration (CWI). The CWI framework, which may be referred to as a high level of integration, was developed to make the whole search and saving process easier and systematic. CWI contains all the common methods required to do the whole process of search and saving the data in relevant tables.

In operation, the CWI data adaptor changes the order's status to in process, and checks the input parameters passed to the method and initiates the search accordingly. In a criminal background search, if the input parameters contain the case number information then the case number search is performed, else the name is searched. The Data Adaptor performs the name search (as per the search criteria) on the website by sending/generating the post string of the search parameters and passing the same to the search URL of the integration to get the search result.

For criminal background searches, if the case number is found, then the case number and the relevant information to perform the case number search is saved in the MIPTempDb and the Person's/Screening's (screeningPersonalDataType) status is changed to the A (to indicate that the name search was done and all the cases are saved in MIPTempDb and now the case number search need to be performed).

On the other hand, if the search returns no records then the data in relevant tables of MIP database is filled and the status of the order will be changed to Y and also the last_updated_on time will be updated to the current time. Result status of the order will be stamped with the status as "Clear".

If cases were found and saved in MIPTempDb, and the Data Adaptor received the parameters to perform a case number search, CWI integration performs the case number search by generating the post string with the parameters received and posts the data to the case number search URL of the integration using the httpWebRequest & httpWebResponse classes of .net or by using the methods of winhttp.dll corn component.

If the Data Adaptor encounters any error while doing the above process, it changes the status of the order as per the error type, and will also change the last_updated_on time to the current time so that the error report can be generated and sent to the relevant web service to give the intimation of the error occurred.

Other types of data source integrations, referred to as Full Data Integration (FDI), are also contemplated by the systems and methods of the present invention. FDI may be achieved via Data Dumps into the MIP database from CD's or FTP, or via XML Gateway or Web Service.

With XML Gateway/Web Services, Object of the Web Service or XML Gateway will be created and the relevant methods provided by the vendor will be called and the relevant parameters picked up from the search criteria. For criminal background checks, if the values returned by the vendor Web Service or XML Gateway indicate that there are cases found for the given search criteria, then other methods of the web services or XML gateway will be called to get more details about the cases found. Matching data will be extracted and will be saved in the relevant tables of MIP Database. If the cases are found then the result status will be Hit, otherwise result status will be Clear.

Like QC and CWI integrations, if the XML Gateway/Web Services search process finishes without any error then the order's transaction status will be changed to Y and the last_updated_on time will also be updated to the current time. If the Data Adaptor encounters any error while doing the process, it changes the status of the order as per the error type, and will also change the last_updated_on time to the current time so that the error report can be generated and sent to the relevant web service to give the intimation of the error occurred.

Figure 5:
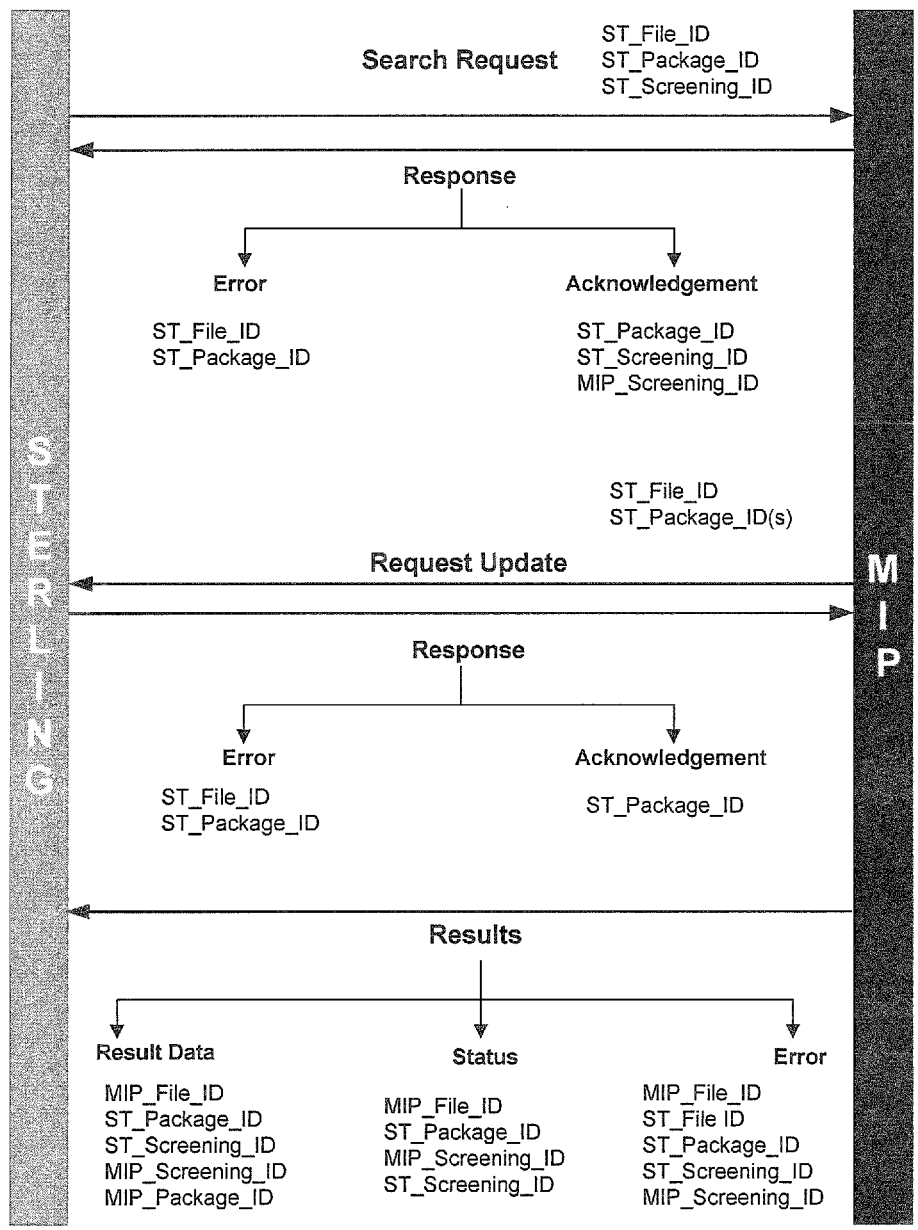
FIG. 5 is a flow diagram illustrating message flow in a single process cycle flow in accordance with an exemplary embodiment of the present invention.

FIG. 5 is a flow diagram illustrating message flow in a single process cycle flow in accordance with an exemplary embodiment of the present invention. The communication between the Sterling Application and MIP is through XML, based on the HR-XML Schema definitions.

In a first step of this method, Sterling sends a Search Request to MIP. On receiving the Search Request, MIP sends back either an Acknowledgement of Error Response XML. In the next step, Sterling sends a result data Request XML to MIP to check for the status of the Search Request. On receiving the request update XML, MIP sends back either an Acknowledgment or Error Response XML (e.g. PackageID not in MIP DB, Schema Validation failure, etc.). In the next step, MIP posts asynchronously to Sterling with XML Result Data (if the request is processed), Error (if there is any error encountered while serving this request), Status (if the request is still not processed).

Figure 6:
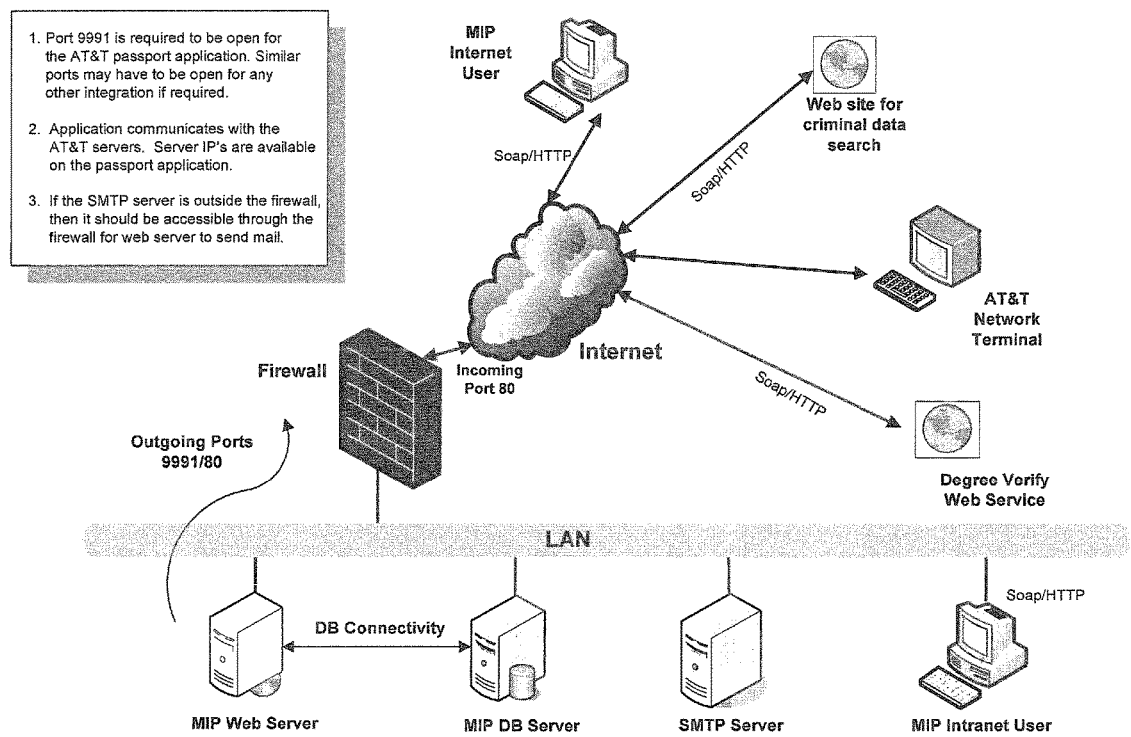
FIG. 6 illustrates in further detail a data fulfillment network and logical flow in accordance with an exemplary embodiment of the present invention for carrying out processes accordingly.
Figure 7:
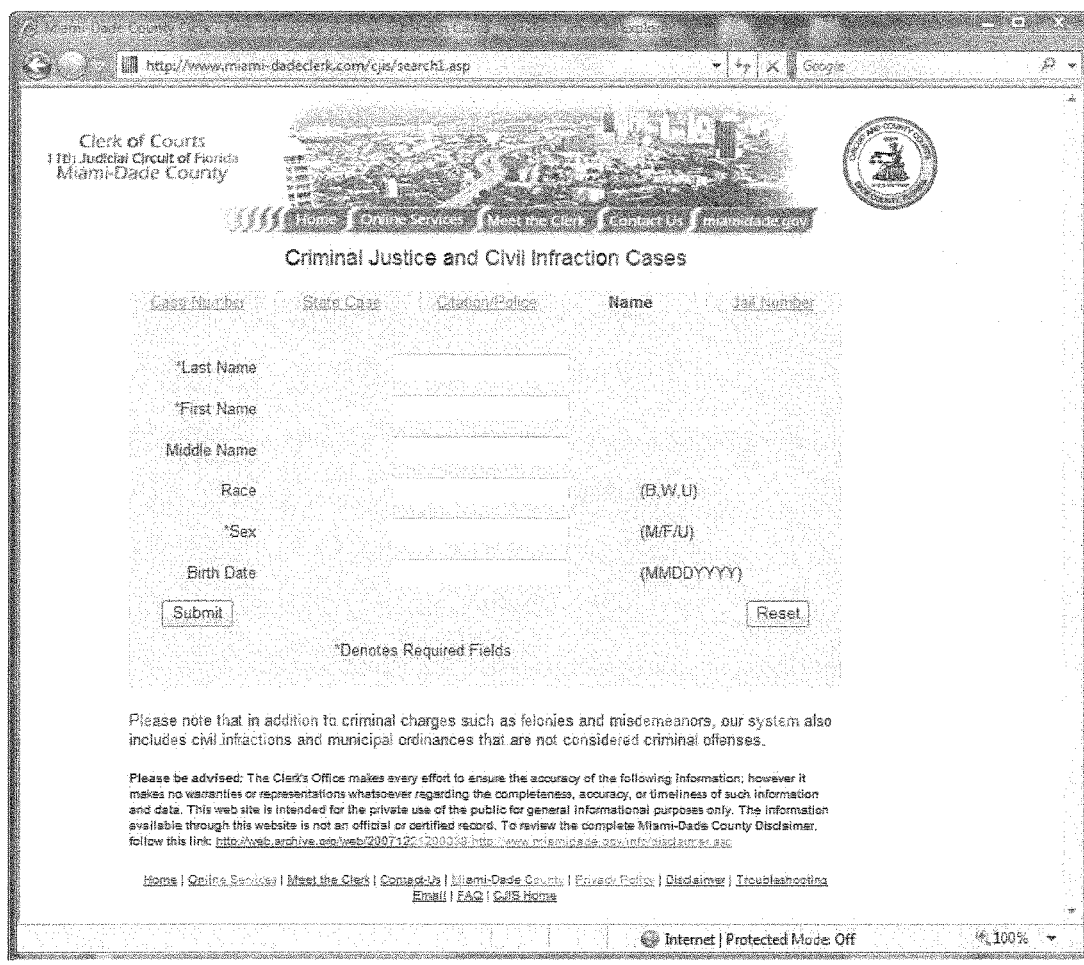
FIGS. 7 through 10 are website screen shots of an exemplary data source portal for carrying out processes in accordance with an exemplary embodiment of the present invention.
Figure 8:

FIG. 6 illustrates in further detail a data fulfillment network and logical flow in accordance with an exemplary embodiment of the present invention for carrying out processes accordingly. In this network, Firewall protection is provided for security purposes due to the exchange of sensitive personalized data through the network. Security specifications include SOAP headers for passing authentication data in Soap request, and Sterling will send username and password in soap header. For each method of web service such authentication is done. All the information about the body and header of Soap message is contained in the WSDL that describes the web service.

Port 9991 is opened for the AT&T passport application. Similar ports may be opened for any other integration if required. The application communicates with the AT&T servers. Server EP's are available on the passport application. If the SMTP server is outside the firewall, then it preferably is accessible through the firewall for web server to send mails.

The application can be hosted in the Sterling intranet if the access is required only within the intranet. In case access is required from outside the intranet over the Internet, then machine 1 may be published on the Internet through a live IP or hosted with an ISP. SMTP service is used on machine 1 to send mail to the DSA and MIP-HD.

Figure 9:
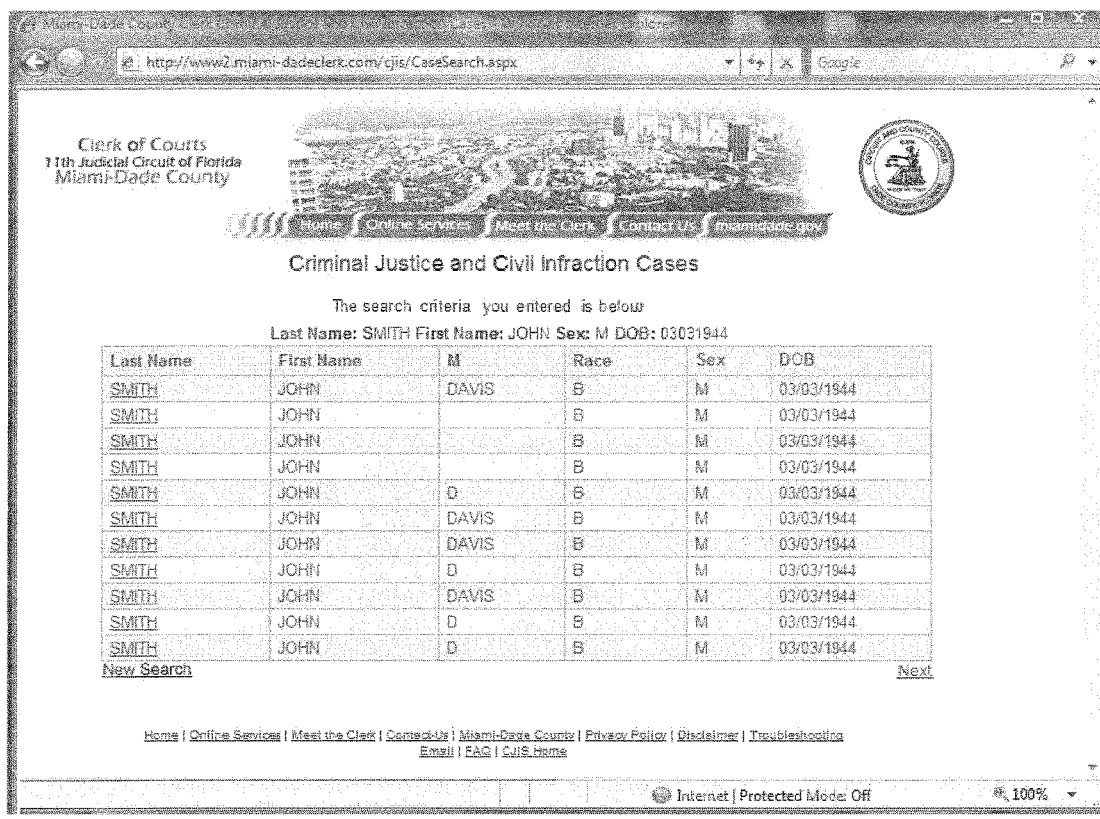
Figure 10:
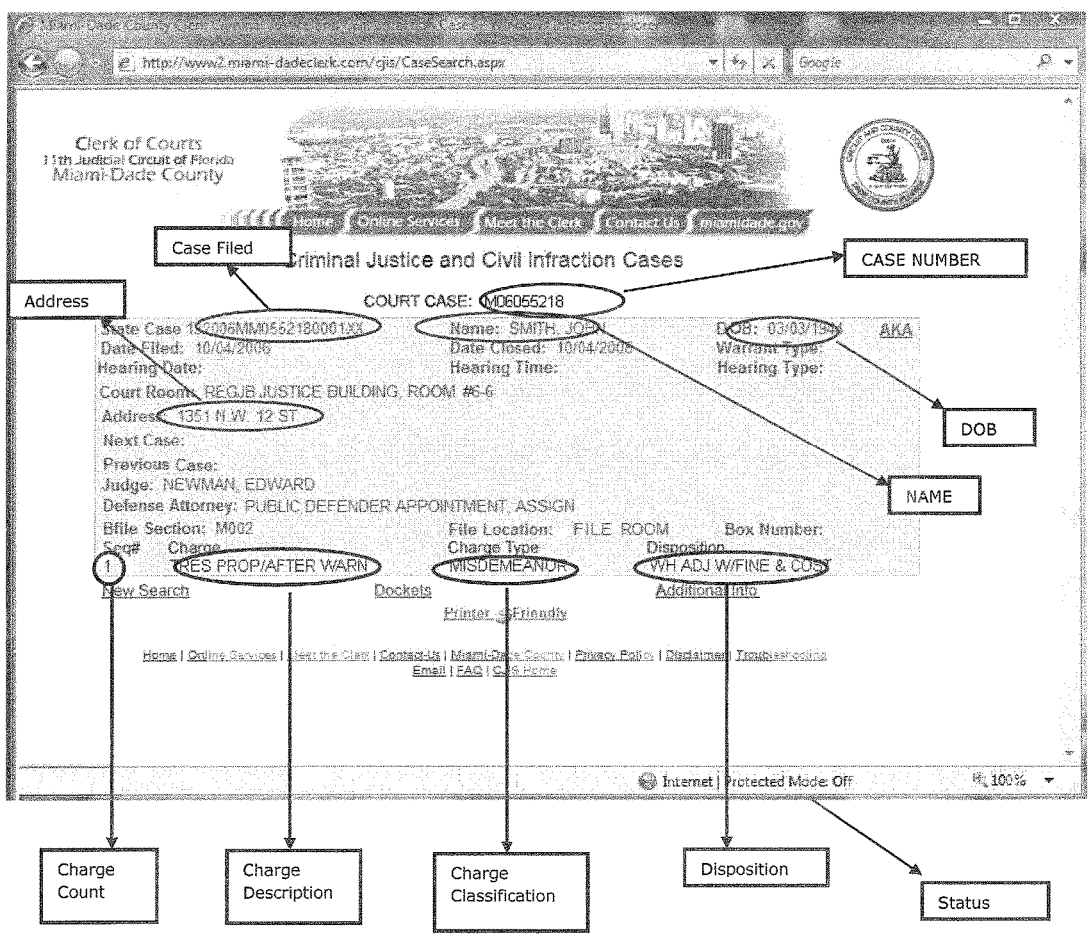

FIGS. 7 through 10 are website screen shots of an exemplary data source portal for carrying out processes in accordance with an exemplary embodiment of the present invention. As shown, when a match is found for the given search criteria, the website displays the records as shown in FIG. 9. When Case Number link is clicked, the website displays the case details related to the search as shown in FIG. 10.

FIG. 11 is a table illustrating a questionnaire to identify attributes associated with a given data source. By knowing the attributes of each data source, and storing such attributes in the register of the smart network, the network is configured to prioritize data stores into a ranked order based on the relative cost of data, speed of data, content of data, and availability of the data source. In this way, the network provides a preferred search path directing the network to search a particular data store first, and then provide a failover switch to an alternative data source if the first data source is down, oversubscribed, or otherwise unavailable for technical reasons such as bandwidth restrictions.

FIG. 12 is a table illustrating results obtained from search requests in accordance with an exemplary embodiment of the present invention. If the data source is found to contain data relevant to the search request, the network is configured to generate a report of the matching data in a format for presentation to a user such as shown in FIG. 12

As made evident by the present disclosure, the smart network described herein has intelligent knowledge about each of the different data sources required to integrate, link, or plug the data sources into the smart network, thus enabling the network to tailor or optimize preferred search paths based on user defined objectives of the search request. It is contemplated that the present invention may be adapted to permit multiple users to simultaneously trace a search request, thus empowering the system to make data available to multiple users of an organization, on a people-centric privileged basis, through development of advanced user management tools for the smart network. It is also contemplated that advanced data mining techniques may be developed to allow for deeper probing and analysis of data once it is stored in the network database.

Furthermore, because the network is capable of storing data from previous searches, the system contemplates cost-effective "Re-checks" of data, allowing the system to determine whether data pertaining to a particular search object may have changed since the time of the previous search. For example, for criminal background checks, it is contemplated the system may be adapted to reuse data which is not anticipated to change from search to search (e.g. birth date, social security number, etc.), and only re-check that data which is likely to change from search to search (e.g. criminal records, driving records, etc.). This will allow the system to provide quicker and more cost-effective re-checks of data since only that data which is likely to change from search to search need be searched and retrieved from the external data sources to determine if data has changed since the time of the previous search. Moreover, the system contemplates development of advanced bandwidth throttling techniques to increase connectivity with external data sources and improve efficiency and timing of future searches.

Although this description has set forth the invention with reference to several preferred embodiments, those of ordinary skill in the art will understand that one may make various modifications without departing from the spirit and the scope of the invention, as set forth in the claims.

What is claimed is:

1. A computer-implemented method comprising:
    establishing a computer network in communication with a plurality of data sources;
    identifying attributes associated with said data sources, and storing said attributes in a register of said computer network;
    receiving a search request comprising search criteria that uniquely identifies a person, and a search goal;
    generating an optimized search path based on the attributes and the search goal;
    selecting at least one data source from which to initiate said search based on the optimized search path;
    sending said search request to said at least one selected data source;
    determining whether or not said selected data source is capable of communicating with said computer network;

wherein if a result of said determining step indicates that said data source communicates with the computer network:
  (i) if said data source contains matching data, transmit said matching data through said computer network for storage in a database of said computer network, and generate a report of said matching data in a format for presentation to a user;
  (ii) if said data source does not contain matching data, transmit a return value through said computer network indicating no matching data was found;
wherein if a result of said determining step indicates that said data source does not communicate with the computer network:
  (i) repeating said selecting, sending, and determining steps until an alternative data source containing matching data is capable of communicating with said computer network;
  (ii) if said alternative data source contains matching data, transmit said matching data through said computer network for storage in a database of said computer network, and generate a report of said matching data in a format for presentation to a user;
  (iii) if said alternative data source does not contain matching data, transmit a return value through said computer network indicating no matching data was found;
providing a report of information to use in a background screening of the person.

2. A method according to claim 1, wherein said attributes include parameters defining the type of data provided by the data source, the location of the data source, the data transfer rate of the data source, the duty cycle of the data source, and the cost of accessing the data source.

3. A method according to claim 2, wherein said sending and transmitting steps are performed over the Internet.

4. A method according to claim 3, wherein said transmitting step includes converting said matching data into HR-XML format.

5. A method according to claim 4, wherein said selecting step is controlled by a user of said computer network.

6. A method according to claim 5, wherein said computer network automatically connects said data sources to said network, and to automatically store attributes of said data sources in said register.

7. A method according to claim 6, further comprising the step of validating said matching data for conformity with configurable rules selected from a group including mandatory data fields, data field length, data field value, and XML schema definitions.

8. A method according to claim 7, wherein said network communication is asynchronous.

9. A method according to claim 1, further comprising: directing a researcher to perform a manual search when both the data source and the alternative data source do not contain matching data.

* * * * *